(12) United States Patent
Koga et al.

(10) Patent No.: US 9,981,601 B2
(45) Date of Patent: May 29, 2018

(54) DISPLAY DEVICE

(71) Applicant: HONDA ACCESS CORP., Niiza-shi, Saitama (JP)

(72) Inventors: Yuki Koga, Niiza (JP); Go Koyama, Niiza (JP); Hirokazu Ishida, Niiza (JP); Liang Chen, Niiza (JP); Noriyuki Kiyota, Niiza (JP)

(73) Assignee: HONDA ACCESS CORP., Niiza-shi, Saitama (JP)

( * ) Notice: Subject to any disclaimer, the term of this patent is extended or adjusted under 35 U.S.C. 154(b) by 0 days. days.

(21) Appl. No.: 15/725,576

(22) Filed: Oct. 5, 2017

(65) Prior Publication Data

US 2018/0111548 A1    Apr. 26, 2018

(30) Foreign Application Priority Data

Oct. 20, 2016 (JP) .................. 2016-205801

(51) Int. Cl.
| | |
|---|---|
| *B60Q 3/00* | (2017.01) |
| *B60Q 3/60* | (2017.01) |
| *F21V 11/00* | (2015.01) |
| *F21V 3/00* | (2015.01) |
| *B60Q 3/217* | (2017.01) |
| *G09F 13/04* | (2006.01) |
| *F21Y 115/10* | (2016.01) |

(52) U.S. Cl.
CPC .............. *B60Q 3/60* (2017.02); *B60Q 3/217* (2017.02); *F21V 3/00* (2013.01); *F21V 11/00* (2013.01); *G09F 13/0413* (2013.01); *F21Y 2115/10* (2016.08); *G09F 2013/044* (2013.01); *G09F 2013/045* (2013.01)

(58) Field of Classification Search
CPC ... B60Q 3/60; F21V 11/00; F21V 3/00; F21V 3/217; G09F 13/0413
See application file for complete search history.

(56) References Cited

U.S. PATENT DOCUMENTS

| | | | | |
|---|---|---|---|---|
| 6,419,306 B2 * | 7/2002 | Sano | ...................... | B60Q 1/323 296/209 |
| 6,971,758 B2 * | 12/2005 | Inui | ...................... | G02B 6/0018 362/23.01 |
| 8,770,812 B2 * | 7/2014 | Kino | ...................... | B60Q 1/323 362/23.17 |

FOREIGN PATENT DOCUMENTS

JP          5820286 B2    11/2015

* cited by examiner

*Primary Examiner* — Thomas M Sember
(74) *Attorney, Agent, or Firm* — Westerman, Hattori, Daniels & Adrian, LLP

(57) ABSTRACT

A display device includes: a transparent plate-shaped substrate capable of blocking light transmission in its partial region; a planar light-emitting body disposed on a back surface side of the substrate; a light-shielding plate capable of blocking light transmission in its partial region and disposed between the substrate and the light-emitting body; and a design part displayed on the substrate, having a predetermined shape formed from a character or graphic. A first light-shielding region formed from a recess with a same shape as an outline of the design part, and a second light-shielding region having a shape enlarged outward from an outline of the recess by a first dimension are respectively provided on the back surface side of the substrate and a front or back surface side of the plate. First and second light-shielding layers blocking light from the light-emitting body are formed in the first and second light-shielding regions, respectively.

9 Claims, 7 Drawing Sheets

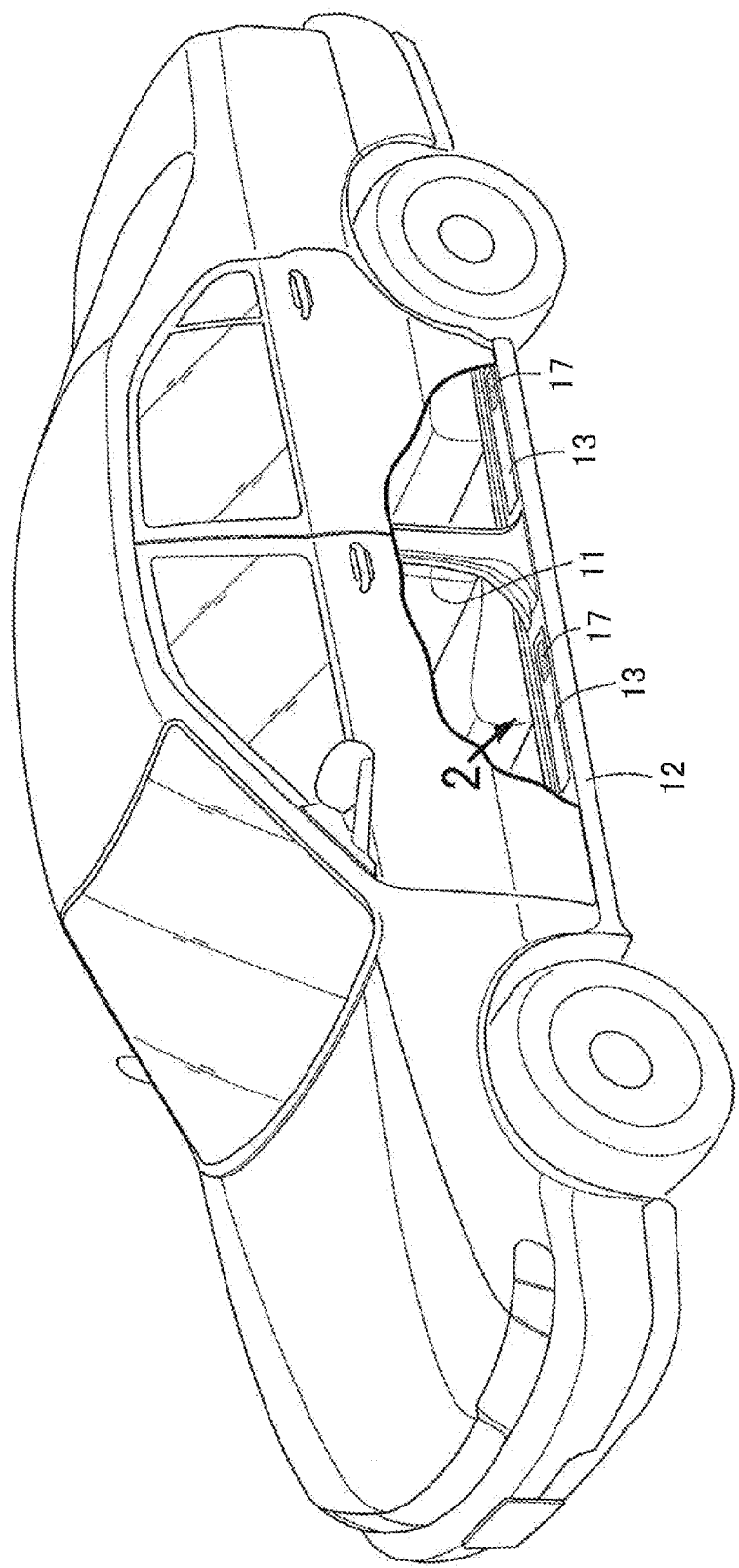

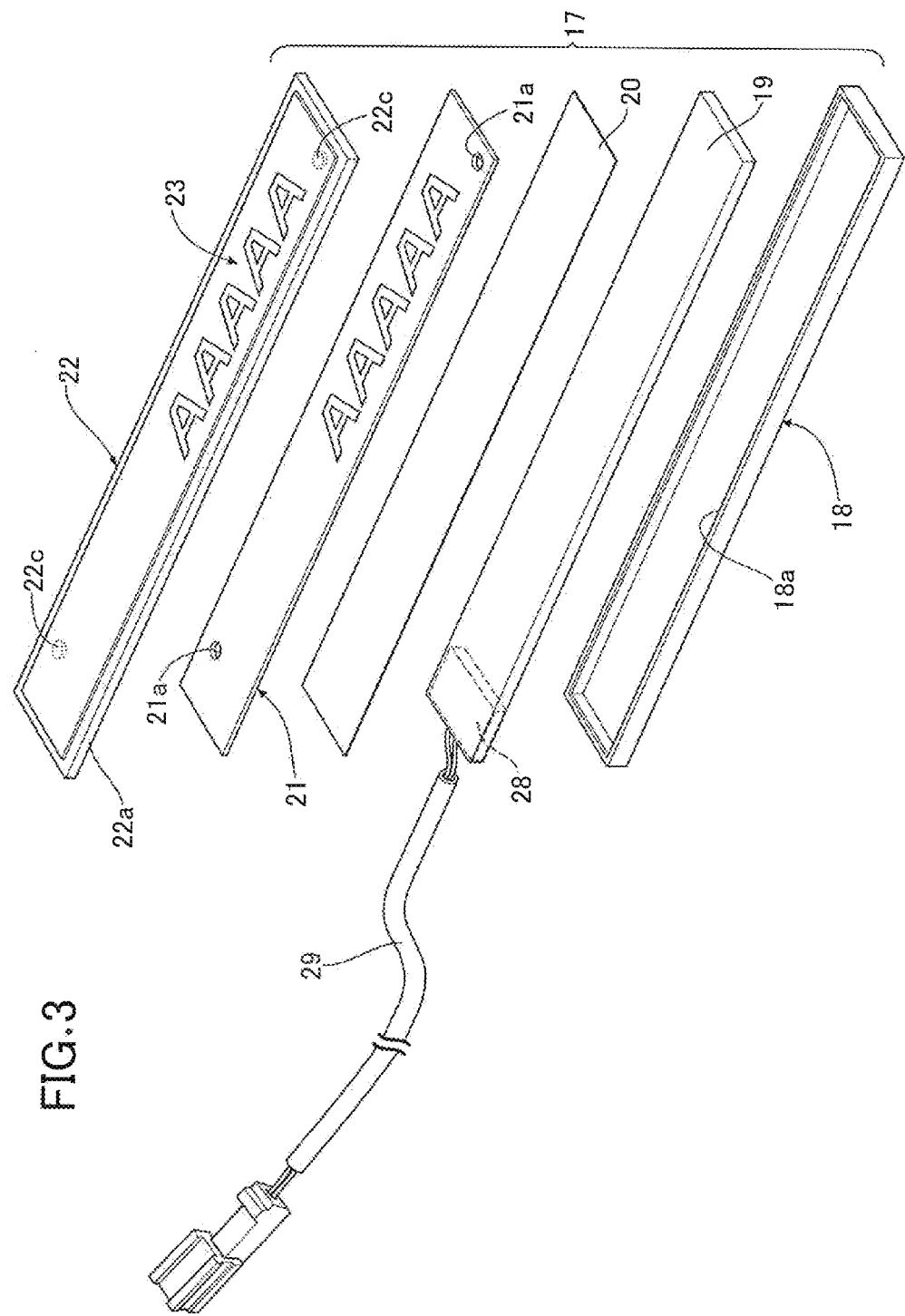

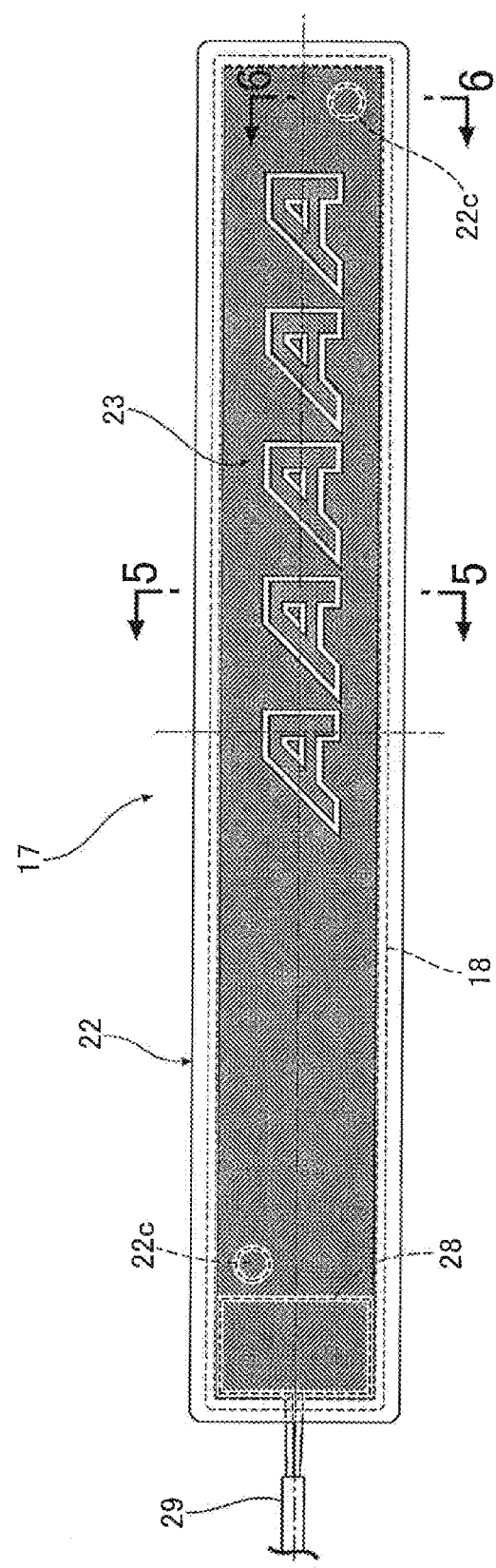

DISPLAY DEVICE

BACKGROUND OF THE INVENTION

Field of the Invention

The present invention relates to a display device comprising: a transparent plate-shaped substrate that is capable of blocking transmission of light in a partial region of the plate-shaped substrate; a planar light-emitting body that is disposed on a back surface side of the plate-shaped substrate; and a design part that is displayed on the plate-shaped substrate and has a predetermined shape formed from a character or a graphic.

Description of the Related Art

Japanese Patent No. 5820286 has made known an illumination plate for a vehicle, which includes a transparent resin substrate, a light transmission control layer, and a planar light source, a light non-transmissive character-shaped body being attached on a front surface of the substrate, the light transmission control layer being superposed on a back surface side of the substrate and having an opening slightly larger than an outline of the character-shaped body, and the planar light source being superposed on a back surface side of the light transmission control layer. The illumination plate enhances a design effect by making light emitted from the planar light source pass through a gap between the opening of the light transmission control layer and the outline of the character-shaped body of the substrate so that the character-shaped body is emerged on the front surface of the substrate.

In such an illumination plate for a vehicle, when a projection amount of the character-shaped body projecting from the front surface of the transparent resin substrate is increased, a three-dimensional appearance of the character-shaped body is enhanced, thereby improving an outer aesthetic appearance thereof. However, in the above-described conventional illumination plate, when the projection amount of the character-shaped body is increased, a foot of an occupant when getting on and off the vehicle tends to contact the character-shaped body, thereby causing problems of damaging the character-shaped body and hindering getting on and off of the occupant.

SUMMARY OF THE INVENTION

The present invention has been accomplished in light of such circumstances, and it is an object thereof to provide a display device capable of displaying a three-dimensional design part on a transparent plate-shaped substrate without projecting a front surface of the plate-shaped substrate.

In order to achieve the object, according to a first aspect of the present invention, there is provided a display device comprising: a transparent plate-shaped substrate that is capable of blocking transmission of light in a partial region of the plate-shaped substrate; a planar light-emitting body that is disposed on a back surface side of the plate-shaped substrate; a light-shielding plate that is disposed between the plate-shaped substrate and the planar light-emitting body and capable of blocking transmission of light in a partial region of the light-shielding plate; and a design part that is displayed on the plate-shaped substrate and has a predetermined shape formed from a character or a graphic, wherein a first light-shielding region is provided on the back surface side of the plate-shaped substrate, the first light-shielding region being formed from a recess having a same shape as an outline of the design part, and a second light-shielding region is provided on a front surface side or a back surface side of the light-shielding plate, the second light-shielding region having a shape that is enlarged outward from an outline of the recess by a first dimension, and a first light-shielding layer blocking light from the planar light-emitting body is formed in the first light-shielding region, and a second light-shielding layer blocking light from the planar light-emitting body is formed in the second light-shielding region.

In accordance with the first aspect, the display device includes: the transparent plate-shaped substrate that is capable of blocking transmission of light in the partial region of the plate-shaped substrate; the planar light-emitting body that is disposed on the back surface side of the plate-shaped substrate; the light-shielding plate that is disposed between the plate-shaped substrate and the planar light-emitting body and capable of blocking transmission of light in the partial region of the light-shielding plate; and the design part that is displayed on the plate-shaped substrate and has the predetermined shape formed from a character or a graphic. The first light-shielding region is provided on the back surface side of the plate-shaped substrate, the first light-shielding region being formed from the recess having the same shape as the outline of the design part, and the second light-shielding region is provided on the front surface side or the back surface side of the light-shielding plate, the second light-shielding region having the shape that is enlarged outward from the outline of the recess by the first dimension, and the first light-shielding layer blocking light from the planar light-emitting body is formed in the first light-shielding region, and the second light-shielding layer blocking light from the planar light-emitting body is formed in the second light-shielding region. Therefore, when it is bright in a daytime, the first light-shielding layer becomes visible as the three-dimensional design part through the transparent plate-shaped substrate, thereby enabling an outer aesthetic appearance of the design part to be enhanced, and when it is dark at night, light from the planar light-emitting body is transmitted along an outer periphery of the design part through a gap between the first light-shielding layer and the second light-shielding layer to make the design part emerged, thereby enabling the outer aesthetic appearance thereof to be enhanced. Moreover, since a front surface of the plate-shaped substrate can be kept flat while causing the design part to be shown three-dimensionally, it is possible to prevent any foreign object from being caught by the design part.

According to a second aspect of the present invention, in addition to the first aspect, a third light-shielding region is provided on the front surface side or the back surface side of the light-shielding plate, the third light-shielding region having a shape that is contracted inward from the outline of the recess by a second dimension, and a third light-shielding layer blocking light from the planar light-emitting body is formed in the third light-shielding region.

In accordance with the second aspect, the third light-shielding region is provided on the front surface side or the back surface side of the light-shielding plate, the third light-shielding region having the shape that is contracted inward from the outline of the recess by the second dimension, and the third light-shielding layer blocking light from the planar light-emitting body is formed in the third light-shielding region. Therefore, even when a metal vapor-deposited film has an insufficient thickness or a pinhole present therein, it is possible to further enhance the outer aesthetic appearance of the design part, by blocking light emitted from planar light-emitting body by means of a black printed layer so as to prevent leakage of the light from the metal vapor-deposited film.

According to a third aspect of the present invention, in addition to the second aspect, the second dimension is larger than an assembly tolerance generated when the plate-shaped substrate is assembled to the light-shielding plate, in a direction along a back surface of the plate-shaped substrate.

In accordance with the third aspect, the second dimension is larger than the assembly tolerance generated when the plate-shaped substrate is assembled to the light-shielding plate, in the direction along the back surface of the plate-shaped substrate. Therefore, even when the light-shielding plate is assembled to the plate-shaped substrate in a displaced manner, the third light-shielding layer is not projected to an outside of the outline of the design part, thereby preventing deterioration of the outer aesthetic appearance of the design part.

According to a fourth aspect of the present invention, in addition to any one of the first to third aspects, the first light-shielding layer is formed from a metal vapor-deposited film formed on an inner surface of the recess.

In accordance with the fourth aspect, the first light-shielding layer is formed from the metal vapor-deposited film formed on the inner surface of the recess. Therefore, the design part is glittered in a metallic tone, thereby enabling the outer aesthetic appearance thereof to be enhanced.

According to a fifth aspect of the present invention, in addition to any one of the first to third aspects, the second light-shielding layer is formed by laminating a surface color printed layer, a white printed layer, and a black printed layer from a front surface side to a back surface side of the second light-shielding layer.

In accordance with the fifth aspect, the second light-shielding layer is formed by laminating the surface color printed layer, the white printed layer, and the black printed layer from the front surface side to the back surface side of the second light-shielding layer. Therefore, while reliably blocking light from the planar light-emitting body by means of the black printed layer, color development of the surface color printed layer is improved by the white printed layer sandwiched between the black printed layer and the surface color printed layer, thereby enabling an outer aesthetic appearance of the surface color printed layer, which is visually observed from the front surface side of the plate-shaped substrate, to be enhanced.

According to a sixth aspect of the present invention, there is provided a display device comprising: a transparent plate-shaped substrate that is capable of blocking transmission of light in a partial region of the plate-shaped substrate; a planar light-emitting body that is disposed on a back surface side of the plate-shaped substrate; and a design part that is displayed on the plate-shaped substrate and has a predetermined shape formed from a character or a graphic, wherein a first light-shielding region and a second light-shielding region are provided on the back surface side of the plate-shaped substrate, the first light-shielding region being formed from a recess having a same shape as an outline of the design part, and the second light-shielding region surrounding a periphery of the recess via a gap of a first dimension, and a first light-shielding layer blocking light from the planar light-emitting body is formed in the first light-shielding region, and a second light-shielding layer blocking light from the planar light-emitting body is formed in the second light-shielding region.

In accordance with the sixth aspect, the display device includes: the transparent plate-shaped substrate that is capable of blocking transmission of light in the partial region of the plate-shaped substrate; the planar light-emitting body that is disposed on the back surface side of the plate-shaped substrate; and the design part that is displayed on the plate-shaped substrate and has the predetermined shape formed from a character or a graphic. The first light-shielding region and the second light-shielding region are provided on the back surface side of the plate-shaped substrate, the first light-shielding region being formed from the recess having the same shape as the outline of the design part, and the second light-shielding region surrounding a periphery of the recess via the gap of the first dimension, and the first light-shielding layer blocking light from the planar light-emitting body is formed in the first light-shielding region, and the second light-shielding layer blocking light from the planar light-emitting body is formed in the second light-shielding region. Therefore, when it is bright in a daytime, the first light-shielding layer becomes visible as the three-dimensional design part through the transparent plate-shaped substrate, thereby enabling an outer aesthetic appearance of the design part to be enhanced, and when it is dark at night, light from the planar light-emitting body is transmitted along an outer periphery of the design part through a gap between the first light-shielding layer and the second light-shielding layer to make the design part emerged, thereby enabling the outer aesthetic appearance thereof to be enhanced. Moreover, since a front surface of the plate-shaped substrate can be kept flat while causing the design part to be shown three-dimensionally, it is possible to prevent any foreign object from being caught by the design part. Further, since the plate-shaped substrate has a function as the light-shielding plate, a thickness of the display device can be reduced by omitting the light-shielding plate.

According to a seventh aspect of the present invention, in addition to the sixth aspect, the first light-shielding layer is formed from a metal vapor-deposited film formed on an inner surface of the recess.

In accordance with the seventh aspect, the first light-shielding layer is formed from the metal vapor-deposited film formed on the inner surface of the recess. Therefore, the design part is glittered in a metallic tone, thereby enabling the outer aesthetic appearance thereof to be enhanced.

According to an eighth aspect of the present invention, in addition to the seventh aspect, the first light-shielding layer further comprises a black printed layer laminated on a back surface side of the metal vapor-deposited film.

In accordance with the eighth aspect, the first light-shielding layer further comprises the black printed layer laminated on the back surface side of the metal vapor-deposited film. Therefore, even when the metal vapor-deposited film has an insufficient thickness or a pinhole present therein, it is possible to further enhance the outer aesthetic appearance of the design part, by blocking light emitted from planar light-emitting body by means of a black printed layer so as to prevent leakage of the light from the metal vapor-deposited film.

According to a ninth aspect of the present invention, in addition to any one of the first to third aspects, the display device is provided on a step part at a lower edge of a door opening of a vehicle.

In accordance with the ninth aspect, the display device is provided on the step part at the lower edge of the door opening of the vehicle. Therefore, when an occupant gets on and off the vehicle, the display device becomes visible and a high-quality feeling can be obtained, and in addition, when it is dark at night and the like, the step part is illuminated with light leaked from a periphery of the design part, which allows the occupant to easily get on and off the vehicle.

Note that a silver printed layer 27 of embodiments corresponds to the surface color printed layer of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 1 is a partially cutaway perspective view of an automobile. (first embodiment)

FIG. 3 is an exploded perspective view of a display device. (first embodiment)

FIG. 4 is a view taken in a direction of arrow 4 in FIG. 2B. (first embodiment)

DESCRIPTION OF THE PREFERRED EMBODIMENTS

First Embodiment

A first embodiment of the present invention is explained below based on FIGS. 1 to 6.

As shown in FIG. 1, a garnish 13 is provided along an upper surface of a step part 12 at a lower edge of a door opening 11 of an automobile.

Figure 2A:
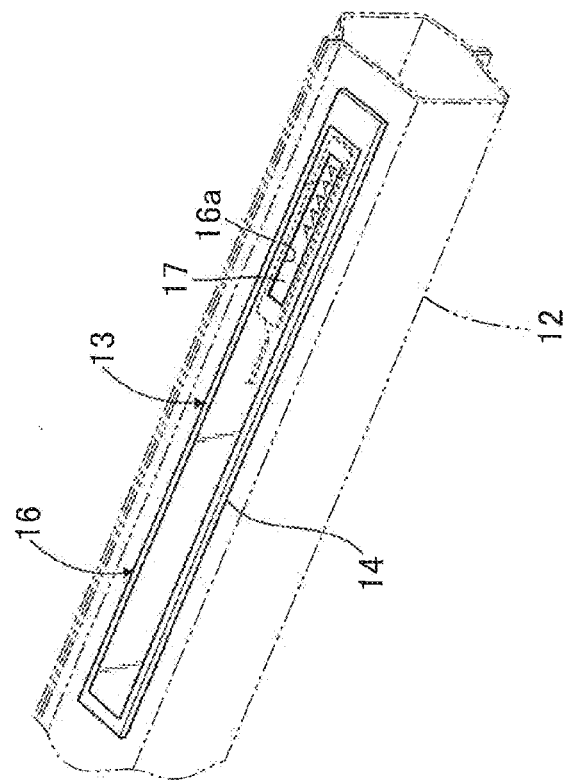
FIGS. 2A and 2B are enlarged views of part 2 in FIG. 1. (first embodiment)
Figure 2B:
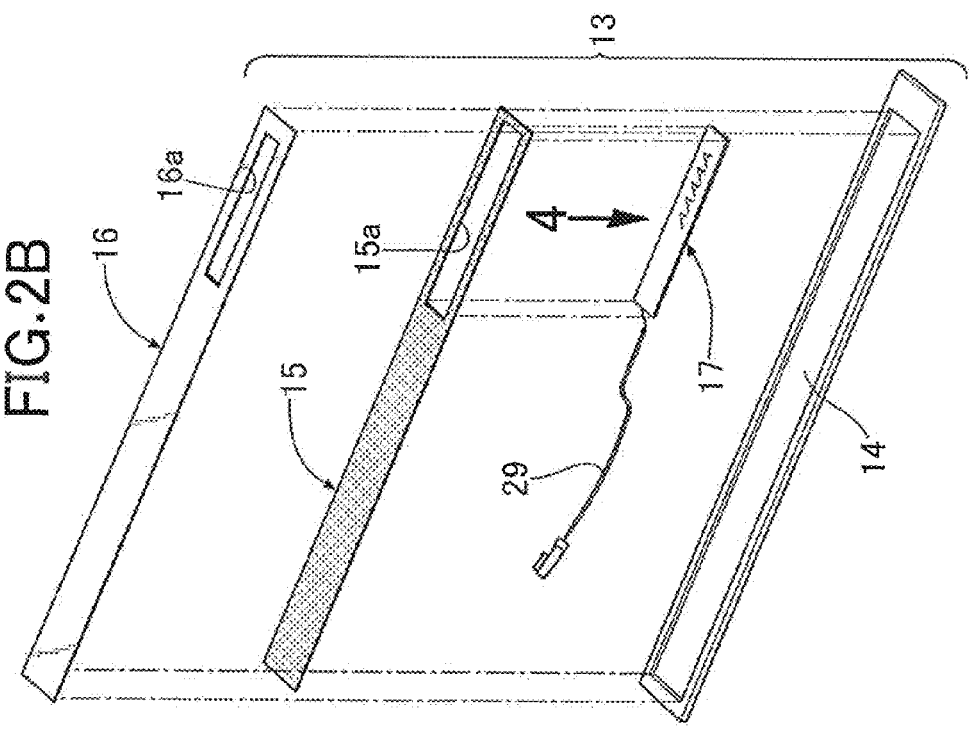

As shown in FIGS. 2A and 2B, the garnish 13 includes a garnish main body 14 formed from a plate-shaped member made of a synthetic resin, a metallic protection plate 16 stuck on an upper surface of the garnish main body 14 with a double-sided tape 15, and a display device 17 fitted into a cutout 15a of the double-sided tape 15 and clamped between the upper surface of the garnish main body 14 and a lower surface of the protection plate 16, an upper surface of the display device 17 being exposed upward from an opening 16a formed in the protection plate 16.

Next, a structure of the display device 17 is described in detail based on FIGS. 3 to 6.

The display device 17 includes a casing 18 made of a rectangular opaque synthetic resin plate, and a flange 18a facing upward is formed on an outer periphery of the casing 18. A planar light-emitting body 19, a light diffusion sheet 20, a light-shielding plate 21, and a plate-shaped substrate 22 are superposed on an upper surface of the casing 18. A flange 22a facing downward is formed on an outer periphery of the plate-shaped substrate 22 and fitted and adhered to the flange 18a of the casing 18.

An upper surface (front surface) of the plate-shaped substrate 22 is basically flat, but a lower surface (back surface) thereof is formed with a plurality of recesses 22b configuring a design part 23 formed from characters which are to be displayed. An inner surface of the recess 22b is formed as a first light-shielding region A1 (see FIG. 5), in which an aluminum metal vapor-deposited film 24 is formed as a first light-shielding layer L1 blocking light.

Figure 5:
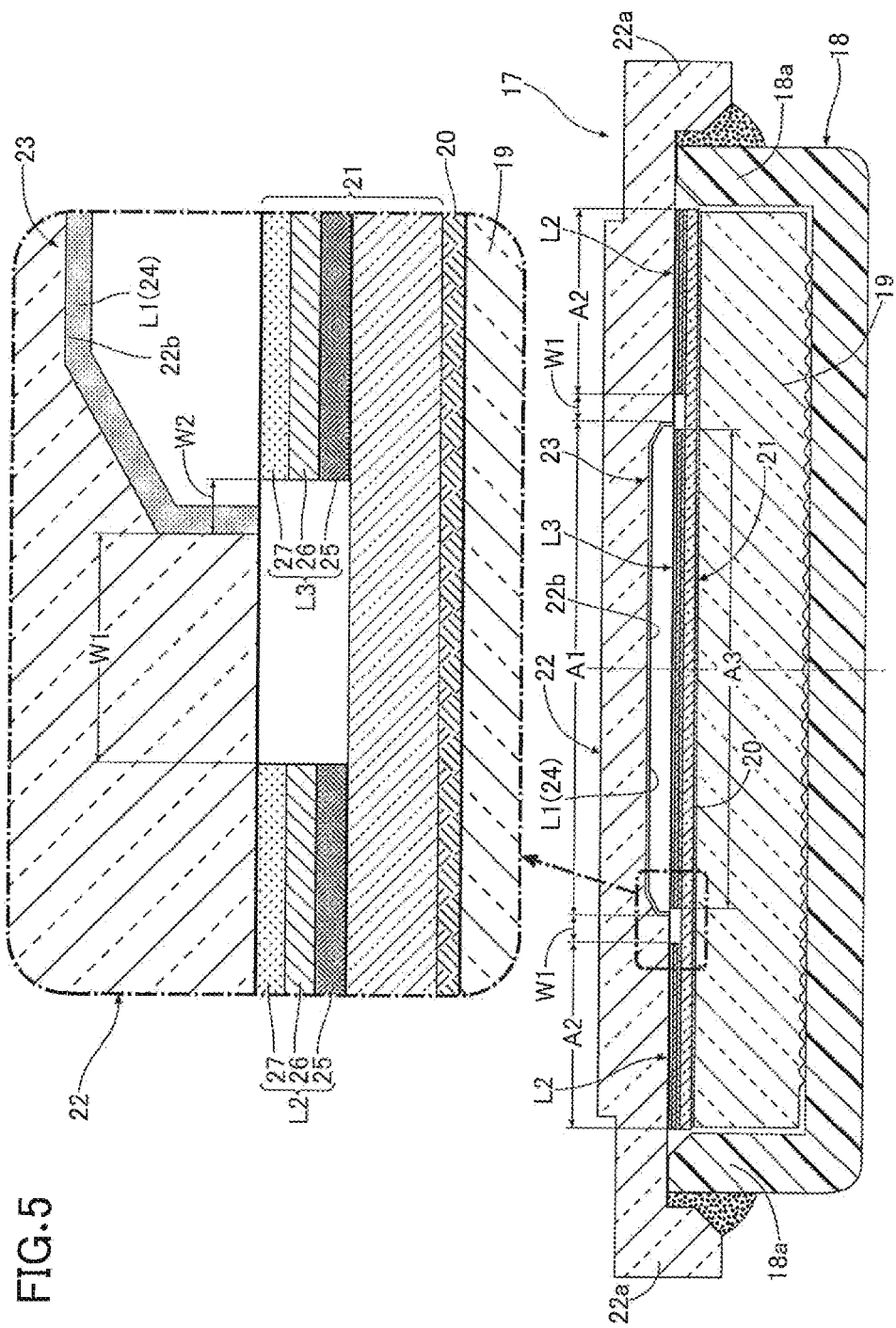
FIG. 5 is an enlarged sectional view along line 5-5 in FIG. 4. (first embodiment)
Figure 6:
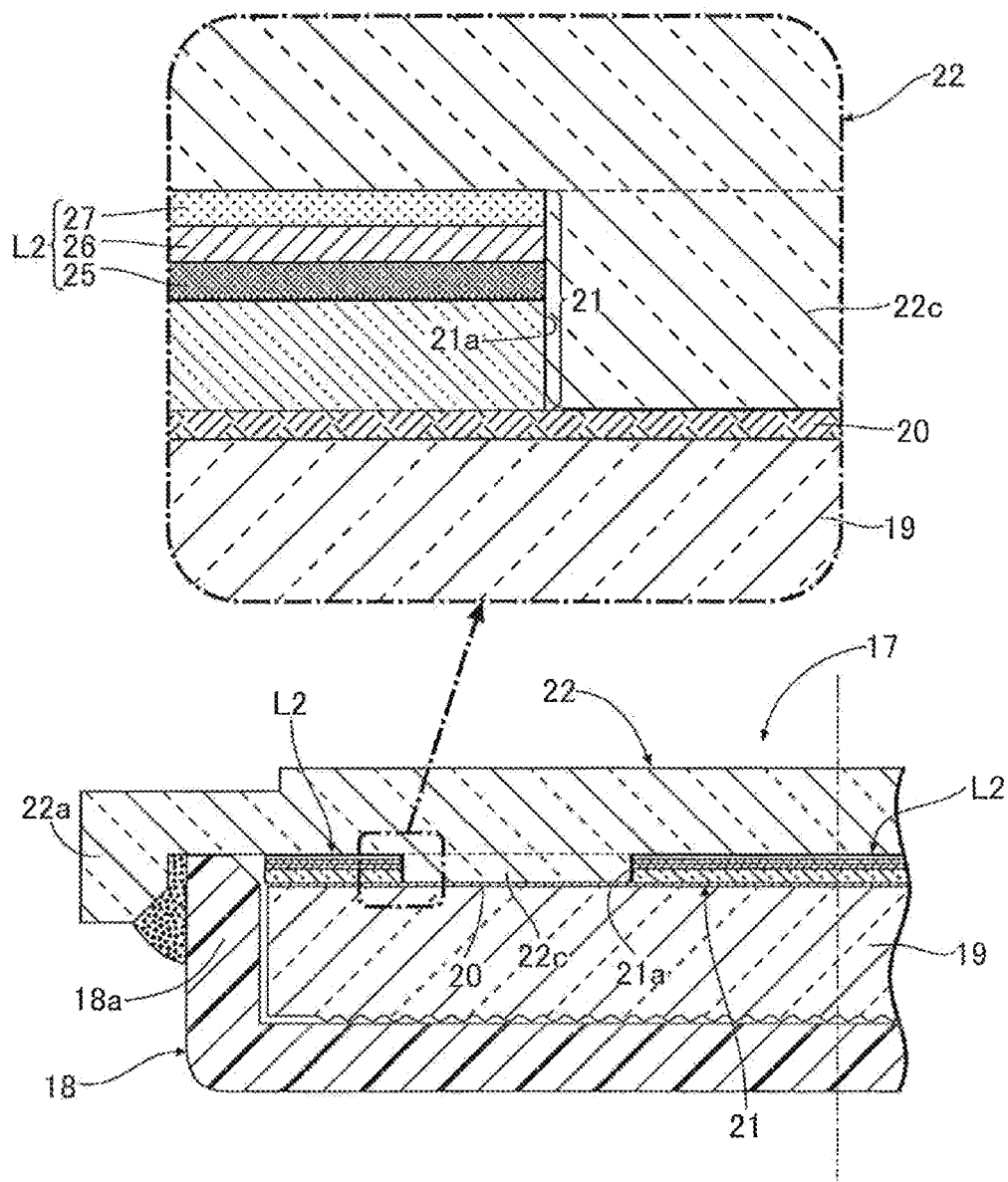
FIG. 6 is an enlarged sectional view along line 6-6 in FIG. 4. (first embodiment)

The light-shielding plate 21 made of a transparent synthetic resin plate laminated on the lower surface of the plate-shaped substrate 22 includes a second light-shielding region A2 and a third light-shielding region A3, the second light-shielding region A2 surrounding a periphery of an outline of the recess 22b with a first dimension or distance W1 (for example, 1.0 mm) therebetween (see FIG. 5) and the third light-shielding region A3 being defined inside the outline of the recess 22b with a second dimension or distance W2 (for example, 0.1 mm) therebetween (see FIG. 5).

A second light-shielding layer L2 formed by laminating three layers, that is, a black printed layer 25, a white printed layer 26, and a silver printed layer 27 in order from bottom to top is formed in the second light-shielding region A2 that is formed on an upper surface (front surface) of the light-shielding plate 21. Similarly, a third light-shielding layer L3 formed by laminating three layers, that is, the black printed layer 25, the white printed layer 26, and the silver printed layer 27 in order from bottom to top is formed in the third light-shielding region A3 that is formed on the upper surface (front surface) of the light-shielding plate 21. Note that although in the present embodiment, the second and third light-shielding layers L2 and L3 are formed on the upper surface (front surface) of the light-shielding plate 21, they may be formed on a lower surface (back surface) thereof. Also in this case, the second and third light-shielding layers L2 and L3 each have a structure having three laminated layers, that is, the black printed layer 25, the white printed layer 26, and the silver printed layer 27 in order from bottom to top.

The planar light-emitting body 19 laminated on the lower surface of the light-shielding plate 21 with the light diffusion sheet 20 sandwiched therebetween is a thick plate made of a transparent synthetic resin, and a wire 29 for energization is connected to a light source 28 including an LED and provided at one end of the planar light-emitting body 19. Light emitted from the light source 28 is transmitted from the one end side to an opposite end side of the planar light-emitting body 19 while being diffusely reflected inside the body 19, so as to make an upper surface of the planar light-emitting body 19, which is not covered with the casing 18, emit light. The light diffusion sheet 20 uniformly diffuses the light emitted from the upper surface of the planar light-emitting body 19. The light diffusion sheet 20 may be omitted.

Two short cylindrical positioning pins 22c are projected downward from the lower surface of the plate-shaped substrate 22, and the light-shielding plate 21 is positioned with respect to the plate-shaped substrate 22 by fitting these cylindrical positioning pins 22c into two positioning holes 21a passing through the light-shielding plate 21.

Next, an operation of the embodiment of the present invention including the above configuration is explained.

When a door of the automobile is opened, the display device 17 provided on the step part 12 at the lower edge of the door opening 11 is exposed so that the design part 23 inside the transparent plate-shaped substrate 22 becomes visible. Since the design part 23 is configured with the silver-colored metal vapor-deposited film 24 of the first light-shielding layer L1 formed on the inner surface of the recess 22b on the lower surface of the transparent plate-shaped substrate 22, the design part 23 looks as if a three-dimensional metal object were embedded inside the plate-shaped substrate 22, and in addition, since the design part 23 is surrounded by the silver printed payer 27 of the second light-shielding layer L2 which is visible through the transparent plate-shaped substrate 22, it is possible to enhance the outer aesthetic appearance of the design part 23.

As a depth of the recess 22b is increased, a three-dimensional appearance of the design part 23 is enhanced so as to improve the outer aesthetic appearance thereof. In this respect, since the design part 23 is configured with the recesses 22b on the lower surface of the plate-shaped substrate 22, even when a height of the design part 23 is increased in order to enhance the outer aesthetic appearance thereof, the design part 23 is not projected to the upper surface side of the plate-shaped substrate 22, and therefore the design part 23 is prevented from being damaged due to contact with a shoe of an occupant and hindering getting on and off of the occupant. The silver printed layer 27 of the second light-shielding layer L2 surrounding the design part 23 is not directly formed on an upper surface of the black printed layer 25, but is formed thereon via the white printed layer 26 interposed therebetween, thereby improving color development of the silver printed layer 27 so as to further improve the outer aesthetic appearance of the design part 23.

Moreover, at night when surroundings are dark, since light emitted from the planar light-emitting body 19 to be transmitted through the light diffusion sheet 20 passes through a gap of the first dimension W1 formed between the first light-shielding layer L1 and the second light-shielding layer L2, so as to leak to an outer periphery of the design part 23, the design part 23 is emerged in the light, thereby improving the outer aesthetic appearance thereof. At this time, since the second light-shielding layer L2 includes the black printed layer 25 though which light is hardly transmitted, light from the planar light-emitting body 19 is prevented from being transmitted through the second light-shielding layer L2 and leaking to the upper surface side of the plate-shaped substrate 22. Further, a pinhole and a part where a film thickness is thin may occur in the metal vapor-deposited film 24 of the first light-shielding layer L1 of the design part 23, through which light may leak so as to deteriorate the outer aesthetic appearance of the design part 23, but since the third light-shielding layer L3 including the black printed layer 25 through which light is hardly transmitted exists below the first light-shielding layer L1, it is prevented that light leaks from the design part 23 so as to deteriorate the outer aesthetic appearance thereof.

Moreover, the light-shielding plate 21 is positioned with respect to the plate-shaped substrate 22 by means of the positioning pins 22c. In this respect, when the light-shielding plate 21 is displaced with respect to the plate-shaped substrate 22 within a range of an assembly tolerance, a part of the third light-shielding layer L3 may be projected to the outer periphery of the design part 23 so as to make the outline of the design part 23 unclear, thereby deteriorating the outer aesthetic appearance of the design part 23. However, according to the present embodiment, since the third light-shielding layer L3 is formed smaller than the outline of the design part 23 by the second dimension W2 and the second dimension W2 is set larger than the assembly tolerance, the part of the third light-shielding layer L3 is prevented from being projected to the outer periphery of the design part 23 to deteriorate the outer aesthetic appearance thereof.

Second Embodiment

Figure 7:
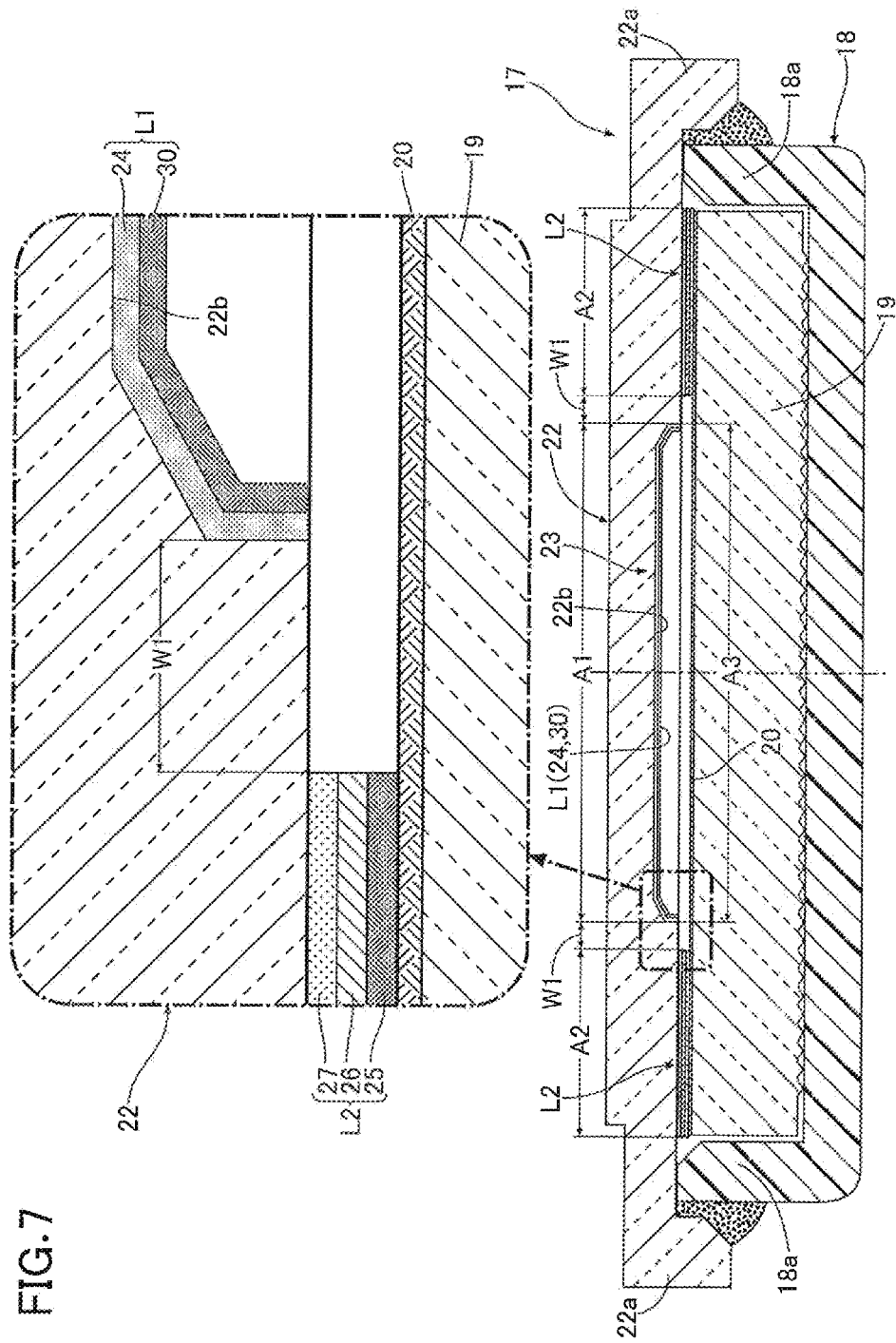
FIG. 7 is a view corresponding to FIG. 5. (second embodiment)

Next, a second embodiment of the present invention is explained based on FIG. 7.

The second embodiment is intended to reduce the number of components and a cost by omitting the light-shielding plate 21 of the first embodiment.

That is, in the second embodiment, the second light-shielding layer L2 in the second light-shielding region A2 is not formed on the upper surface of the light-shielding plate 21 but is formed on the lower surface of the plate-shaped substrate 22. A configuration of the second light-shielding layer L2 is the same as in the first embodiment and formed by laminating three layers, that is, the black printed layer 25, the white printed layer 26, and the silver printed layer 27 in order from bottom to top.

Moreover, in the first embodiment, the third light-shielding layer L3 in the third light-shielding region A3 is formed in the light-shielding plate 21, but in the present embodiment, the third light-shielding layer L3 of the first embodiment is formed as a single black printed layer 30 laminated on a lower surface of the metal vapor-deposited film 24 of the design part 23. Since light is hardly transmitted through the black printed layer 30, even when there is a defect such as a pinhole and the like in the metal vapor-deposited film 24, it is possible to reliably prevent light from leaking to the upper surface side of the design part 23.

Embodiments of the present invention are explained above, but the present invention may be modified in a variety of ways as long as the modifications do not depart from the gist of the present invention.

For example, the display device of the present invention is applicable not only for the garnish 13 provided on the step part 12 of the automobile of the embodiments.

In addition, in the first embodiment, the second light-shielding layer L2 and the third light-shielding layer L3 are provided on the upper surface (front surface) side of the light-shielding plate 21, but may be provided on the lower surface (back surface) side thereof.

Moreover, the surface color printed layer of the present invention is not limited to the silver printed layer 27 of the embodiments and may be a printed layer with an arbitrary color.

Further, the design part of the present invention may represent not only a character but also an arbitrary shape such as a graphic and the like.

Furthermore, the first light-shielding layer L1 of the embodiments is formed by using the metal vapor-deposited film 24, but may be formed from a printed layer.

What is claimed is:
1. A display device comprising:
   a transparent plate-shaped substrate that is capable of blocking transmission of light in a partial region of the plate-shaped substrate;
   a planar light-emitting body that is disposed on a back surface side of the plate-shaped substrate;
   a light-shielding plate that is disposed between the plate-shaped substrate and the planar light-emitting body and capable of blocking transmission of light in a partial region of the light-shielding plate; and
   a design part that is displayed on the plate-shaped substrate and has a predetermined shape formed from a character or a graphic,
   wherein a first light-shielding region is provided on the back surface side of the plate-shaped substrate, the first light-shielding region being formed from a recess having a same shape as an outline of the design part, and a second light-shielding region is provided on a front surface side or a back surface side of the light-shielding plate, the second light-shielding region having a shape that is enlarged outward from an outline of the recess by a first dimension, and a first light-shielding layer blocking light from the planar light-emitting body is formed in the first light-shielding region, and a second light-shielding layer blocking light from the planar light-emitting body is formed in the second light-shielding region.

2. The display device according to claim 1, wherein a third light-shielding region is provided on the front surface side or the back surface side of the light-shielding plate, the third light-shielding region having a shape that is contracted inward from the outline of the recess by a second dimension, and a third light-shielding layer blocking light from the planar light-emitting body is formed in the third light-shielding region.

3. The display device according to claim 2, wherein the second dimension is larger than an assembly tolerance generated when the plate-shaped substrate is assembled to the light-shielding plate, in a direction along a back surface of the plate-shaped substrate.

4. The display device according to claim 1, wherein the first light-shielding layer is formed from a metal vapor-deposited film formed on an inner surface of the recess.

5. The display device according to claim 1, wherein the second light-shielding layer is formed by laminating a surface color printed layer, a white printed layer, and a black printed layer from a front surface side to a back surface side of the second light-shielding layer.

6. The display device according to claim 1, wherein the display device is provided on a step part at a lower edge of a door opening of a vehicle.

7. A display device comprising:
a transparent plate-shaped substrate that is capable of blocking transmission of light in a partial region of the plate-shaped substrate;
a planar light-emitting body that is disposed on a back surface side of the plate-shaped substrate; and
a design part that is displayed on the plate-shaped substrate and has a predetermined shape formed from a character or a graphic,
wherein a first light-shielding region and a second light-shielding region are provided on the back surface side of the plate-shaped substrate, the first light-shielding region being formed from a recess having a same shape as an outline of the design part, and the second light-shielding region surrounding a periphery of the recess via a gap of a first dimension, and
a first light-shielding layer blocking light from the planar light-emitting body is formed in the first light-shielding region, and a second light-shielding layer blocking light from the planar light-emitting body is formed in the second light-shielding region.

8. The display device according to claim 7, wherein the first light-shielding layer is formed from a metal vapor-deposited film formed on an inner surface of the recess.

9. The display device according to claim 8, wherein the first light-shielding layer further comprises a black printed layer laminated on a back surface side of the metal vapor-deposited film.

* * * * *